March 12, 1957 R. F. GAMUNDI 2,784,562
DRIVE FOR VEHICLE AIR CONDITIONING APPARATUS
Filed July 8, 1953 3 Sheets-Sheet 1

INVENTOR.
REYNOLD F. GAMUNDI
BY Hudson, Boughton,
Williams, David & Hoffmann
ATTORNEYS

INVENTOR.
REYNOLD F. GAMUNDI

United States Patent Office 2,784,562
Patented Mar. 12, 1957

2,784,562

DRIVE FOR VEHICLE AIR CONDITIONING APPARATUS

Reynold F. Gamundi, Mayfield Heights, Ohio, assignor to Eaton Manufacturing Company, Cleveland, Ohio, a corporation of Ohio Application July 8, 1953, Serial No. 366,815

4 Claims. (Cl. 62—4)

This invention relates to vehicle air conditioning and, more particularly, to novel driving means for an air conditioning unit serving a compartment of a vehicle.

An object of the present invention is to provide apparatus by which an air conditioning unit serving a vehicle compartment can be satisfactorily driven from the vehicle driving motor, even though the conditioning unit may be located on the vehicle at a point relatively remote from the driving motor, such as in the rear luggage compartment.

Another object is to provide novel driving means for a vehicle air conditioning unit comprising flexible shaft means extending to such unit from a point adjacent the vehicle driving motor, preferably by such shaft means extending beneath the vehicle floor, and automatically controlled clutch means effective to connect the flexible shaft means with an auxiliary power take-off of the driving motor.

Still another object is to provide novel vehicle air conditioning unit drive means of the character above indicated in which the clutch means comprises a pair of magnetic clutch devices affording power transmission connections of relatively high and relatively low transmission ratio values for the flexible shaft, and in which automatic switch means selectively controls the energization of the clutch devices.

Yet another object is to provide novel air conditioning drive means of the kind referred to above in which the switch means controlling the clutch means between the vehicle motor and the flexible shaft is a speed responsive switch means responsive to the operating speed of the vehicle motor.

The invention can be further briefly summarized as consisting in certain novel combinations and arrangements of parts hereinafter described and particularly set out in the claims hereof.

In the accompanying sheets of drawings, forming a part of this specification:

Fig. 5 is a wiring diagram showing the automatic control for the clutch means.

Figure 1:
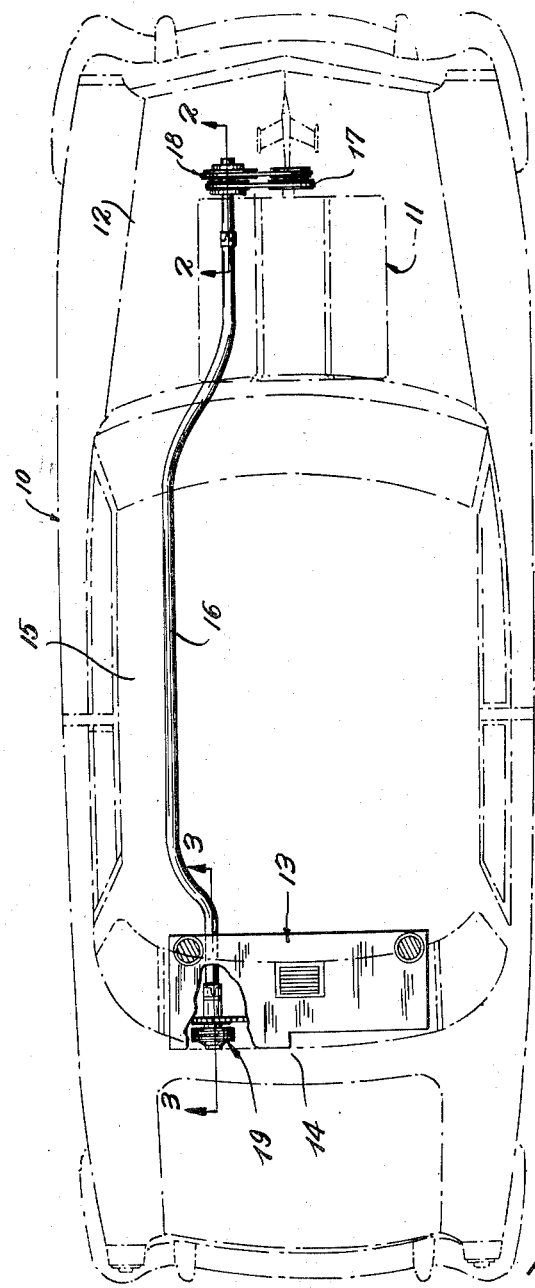
Fig. 1 is a plan view showing a vehicle air conditioning unit driven from the vehicle motor through the novel drive means of the present invention.

In Fig. 1 of the drawings, a motor vehicle 10 is shown as having a conventional driving motor 11 located in a forward engine compartment 12, and also as having an air conditioning unit 13 located in a rear luggage compartment 14 and serving a passenger compartment 15 for cooling and ventilating the latter compartment. The novel driving means of the present invention provides for the driving of the air conditioning unit 13 from the vehicle motor 11 through a flexible shaft 16.

One end of the flexible shaft 16 is disposed adjacent the vehicle motor 11 and is connected with an auxiliary power take-off 17 of the motor through magnetic clutch means 18 to be described hereinafter. The other end of the flexible shaft 16 extends into the luggage compartment 14 and is provided with drive means 19 with which the air conditioning unit 13 is connected. The intermediate portion of the flexible shaft 16 extends from the engine compartment 12 to the luggage compartment 14 by passing beneath the floor of the passenger compartment 15.

Figure 2:
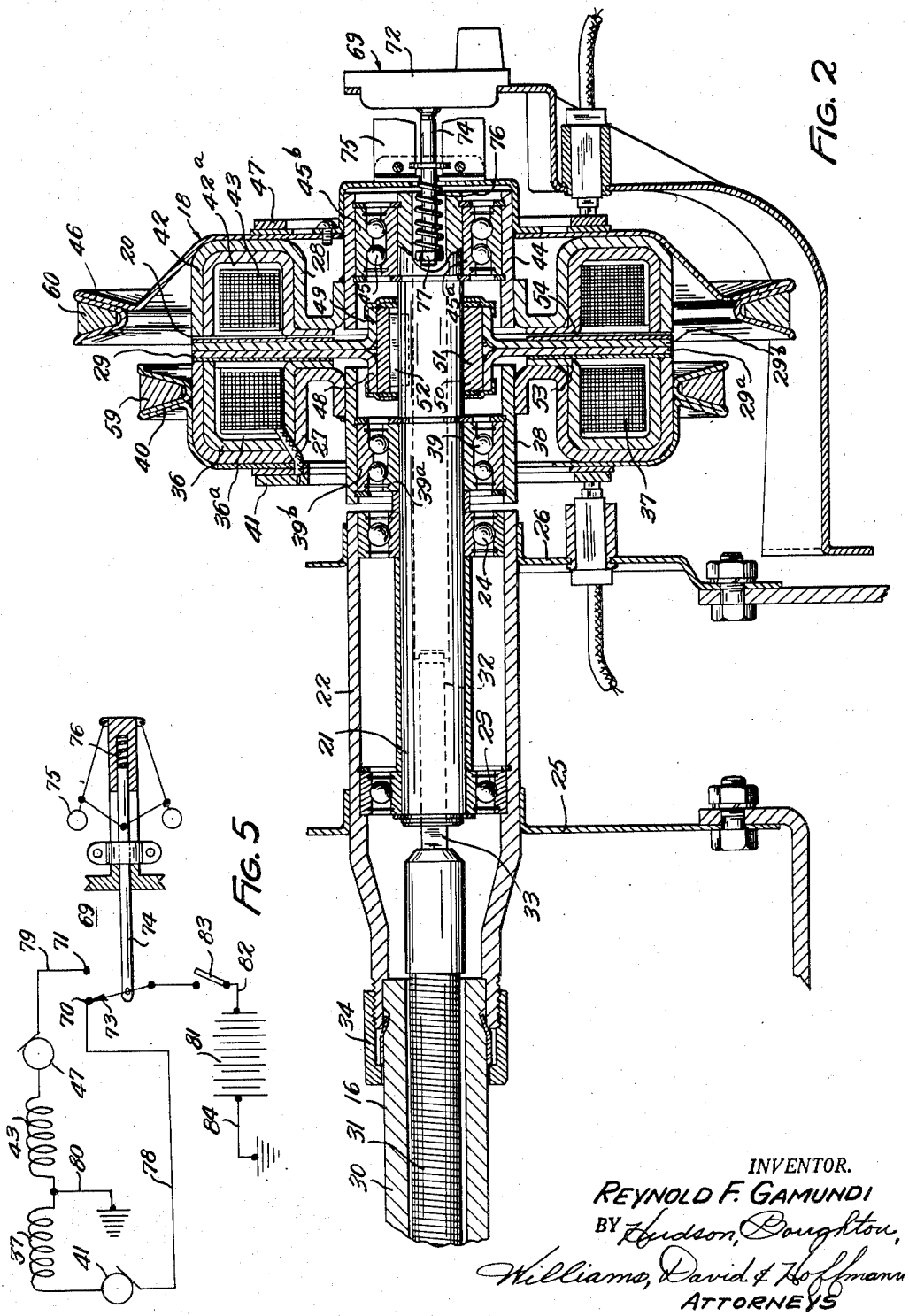
Fig. 2 is a longitudinal section taken through the clutch means of the novel drive means, the section being taken as indicated by section line 2—2 of Fig. 1.

The magnetic clutch means 18 is more fully disclosed in Fig. 2 and includes a rigid shaft member 21 which is rotatably supported in a fixed sleeve 22 by a pair of axially spaced antifriction bearings 23 and 24. The fixed sleeve 22 is suitably mounted on the vehicle structure, such as by being supported at axially spaced points by a pair of laterally spaced wall portions 25 and 26 of the vehicle structure and through which wall portions the fixed sleeve extends. The shaft member 21 is of a length such that a substantial portion thereof extends in forwardly projecting relation from the fixed sleeve 22 and forms a mount for a pair of magnetic clutches 27 and 28 and for an armature 29 which is disposed between and serves both of these clutches. For reasons appearing hereinafter, the magnetic clutch 27 can be conveniently referred to as the low vehicle speed clutch.

The flexible shaft 16 is of a conventional construction comprising a flexible outer tubular sheath 30 and a flexible inner torque transmitting shaft member 31 extending axially through such sheath and rotatable therein. A driving connection between the rigid shaft member 21 and the adjacent end of the flexible shaft member 31 is formed by the provision of an axial passage 32 of a non-circular cross-section in the shaft member 21 in which is engaged a stem 33 of a similar non-circular cross-section provided on the forward end of the shaft member 31. The adjacent end of the sheath 30 of the flexible shaft 16 is connected with the rear end of the fixed sleeve 22 by a coupling 34.

The magnetic clutch 27 comprises an annular magnet frame 36 having an annular recess 36ª therein and a ring-shaped magnet coil 37 disposed in the annular recess. The magnet frame 36 is provided with a central axial mounting sleeve 38 by which this magnet frame is rotatably supported in surrounding coaxial relation to the shaft member 21 by an antifriction bearing 39. The bearing 39 has the inner race 39ª thereof suitably mounted on the shaft member 21 and has its outer race 39ᵇ mounted in and supporting the sleeve 38 of the magnet frame 36. The magnetic clutch 27 also comprises a pulley 40 connected with the magnet frame 36 and disposed in surrounding relation thereto, and a slip ring 41 also mounted on the magnet frame 36 and electrically connected with one end of the magnet coil 37.

The magnetic clutch 28 is similar to the clutch 27 and comprises an annular magnet frame 42 having an annular recess 42ª therein and a ring-shaped magnet coil 43 located in such annular recess. The magnet frame 42 includes a central axial mounting sleeve 44 disposed in surrounding coaxial relation to the shaft member 21 and rotatably supported on the latter by an anti-friction bearing 45. The bearing 45 has the inner race 45ª thereof suitably mounted on the shaft member 21 and its outer race 45ᵇ mounted in and supporting the sleeve member 44. The magnetic clutch 28 also comprises a pulley 46 connected with the magnet frame 42 and disposed in surrounding relation thereto, and a slip ring 47 which is also connected with the magnet frame 42 and with which one end of the magnet coil 43 is electrically connected. For reasons appearing hereinafter, the magnetic clutch 28 can be referred to as the high vehicle speed clutch.

As shown in Fig. 2 of the drawings, the magnetic clutches 27 and 28 are disposed in immediately adjacent coaxial relation with their magnet frames 36 and 42 facing toward each other and separated by an intervening annular air space 20. The clutch means 18 includes the armature 29 which is disposed in the intervening air space 20 and serves both of the magnetic clutches 27 and 28. The armature 29 is a disk-shaped member formed by a pair of disk-shaped plates 29$^a$ and 29$^b$. Oppositely flanged portions 48 and 49 provided on the disk members 29$^a$ and 29$^b$ centrally thereof, cooperate with a bushing 50 in forming a hub member 51 by which the armature 29 is mounted on the shaft member 21 intermediate the bearings 39 and 45.

The armature 29 is drivingly connected with the shaft member 21 by means of a key 52 located in the hub 51. This hub has limited sliding movement on the shaft member 21 axially thereof as permitted by the key 52 so as to provide for shifting of the armature 29 into cooperation with either of the magnet frames 36 and 42 in response to energization of these frames by their magnet coils 37 and 43. The armature disk 29 is provided with friction facings 53 and 54 on opposite sides thereof and which are riveted thereto or otherwise suitably mounted thereon.

Figure 4:
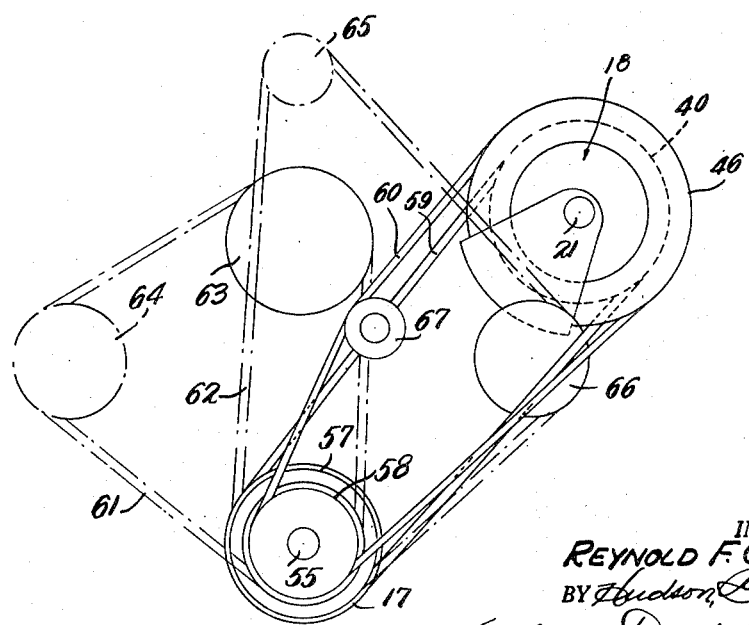
Fig. 4 is an end view of a digrammatic form showing the belted connection of the clutch means with the auxiliary power take-off of the vehicle motor.

As shown in Fig. 4, the auxiliary power take-off 17 of the vehicle motor 11 comprises a group of pulleys mounted on a shaft of the vehicle motor such as the crankshaft 55. This group of pulleys includes large and small pulleys 57 and 58 with which the small and large pulleys 40 and 46 of the magnetic clutches 27 and 28 are connected respectively by belts 59 and 60 extending therearound. The auxiliary power take-off 17 may include other pulleys around which belts 61 and 62 extend respectively. The belt 61 serves to drive the pulley 63 of an engine cooling fan, as well as a pulley 64 of one of the cooling pumps of the vehicle motor. The belt 62 drivingly engages the pulley 65 of an electric generator, as well as the pulley 66 of another of the cooling pumps of the vehicle motor. The belt 60 which engages the pulley 46 of the magnetic clutch 28 is here shown as passing over an idler pulley 67.

The pulley 40 of the magnetic clutch 27 and the pulley 57 of the auxiliary power take-off 17 are of such diameters in relation to each other that they provide a power transmission ratio of approximately .89 to 1 when the magnet frame 36 of this magnetic clutch is driven by the belt 59 extending around these pulleys. The pulleys 46 and 58 are of such diameters in relation to each other as to provide a power transmission ratio of approximately .532 to 1 when the magnet frame 42 of the clutch 28 is driven from the pulley 58 by the belt 60. Therefore, when the vehicle motor is running and the magnetic clutch 27 is energized, this clutch will connect the flexible shaft 16 with the power take-off 17 such that the air conditioning unit 13 will be driven from the vehicle motor with a transmission ratio of approximately .89 to 1. Similarly, when the magnetic clutch 28 is energized, the flexible shaft 16 will be connected with the power take-off 17 such that the air conditioning unit 13 will be driven from the vehicle motor at a power transmission ratio of approximately .532 to 1.

In accordance with the present invention, the energization of the magnetic clutches 27 and 28 is selectively and automatically controlled by switch means 69 which will now be described. The switch means 69 comprises a pair of stationary contacts 70 and 71 located in a suitable housing 72, and a movable contact 73 cooperating with these stationary contacts and which is here shown as being a swingable contact arm. The contact 73 is also located in the housing 72 and is actuated by movement imparted thereto by an axially movable rod 74.

The switch means 69 also includes speed responsive means in the form of centrifugal weights 75 which are suitably connected with the shaft member 21 for rotation therewith and are also connected with the rod 74, such that separation of the weights by centrifugal force will transmit movement to the contact 73 by axial movement of the rod 74. Retraction of the weights 75 and movement of the rod 74 in the opposite direction is produced by a compression spring 76 disposed around the rod and effective against shoulder means 77 on the inner end thereof.

As shown in the wiring diagram of Fig. 5, the stationary switch contacts 70 and 71 are disposed in such relation to the movable switch contact 73 that when the vehicle motor 11 is stopped, the spring 76 will hold the movable contact in an initial position in which it engages the stationary contact 70 and will retain the movable contact in this position until a predetermined speed of the vehicle motor is reached, such as a speed of approximately 2,000 R. P. M.; whereupon the centrifugal weights 75 will be expanded sufficiently to shift the movable contact into engagement with the stationary contact 71.

The circuit arrangement for energizing the magnet coils 37 and 43 of the magnetic clutches 27 and 28 is such that these coils are included in parallel portions of the energizing circuit. This can be accomplished, as shown in Fig. 5, by having the outer ends of the magnet coils 37 and 43 connected respectively with the stationary contacts 70 and 71 through the slip rings 41, 47 and the conductors 78, 79 and by having the other ends of these magnet coils connected with ground through the common ground conductor 80. The movable switch contact 73 is supplied with energizing current from the storage battery 81 of the vehicle through the conductor 82 and through the ignition switch 83. The energizing circuit for the coils is completed through the ground conductor 84 of the battery 81.

In the operation of the above-described clutch means 18, it will be seen that during the time when the vehicle motor is stopped, or during such time that the vehicle motor is running at an idling speed or at a slow speed, the automatic switch means 69 will maintain the contact 73 in engagement with the contact 70 to thereby energize the magnetic clutch 27. The energization of this clutch will cause the armature 29 to engage the magnet frame 36 and thereby connect the flexible shaft 16 and the air conditioning unit 13 with the auxiliary power take-off 17 for driving the air conditioning unit at the desired relatively high transmission ratio of approximately .89 to 1.

When the vehicle motor is operating at a higher speed, such as the 2,000 R. P. M. mentioned above or higher, and the switch member 73 is moved into engagement with the stationary contact 71, the magnetic clutch 28 will be energized to cause the armature 29 to be attracted to and connected with the magnet frame 42. The energization of the clutch 28 will thus cause the shaft 16 to be connected with the auxiliary power take-off 17 for the driving of the air conditioning unit 13 at the desired lower transmission ratio of approximately .532 to 1.

When the speed of the driving motor 11 is again reduced to a slow or idling speed, or if the vehicle motor is stopped, the automaic swich means 69 will shift the movable switch contact 73 back to the stationary contact 70 to thereby re-energize the magnetic clutch 27.

Figure 3:
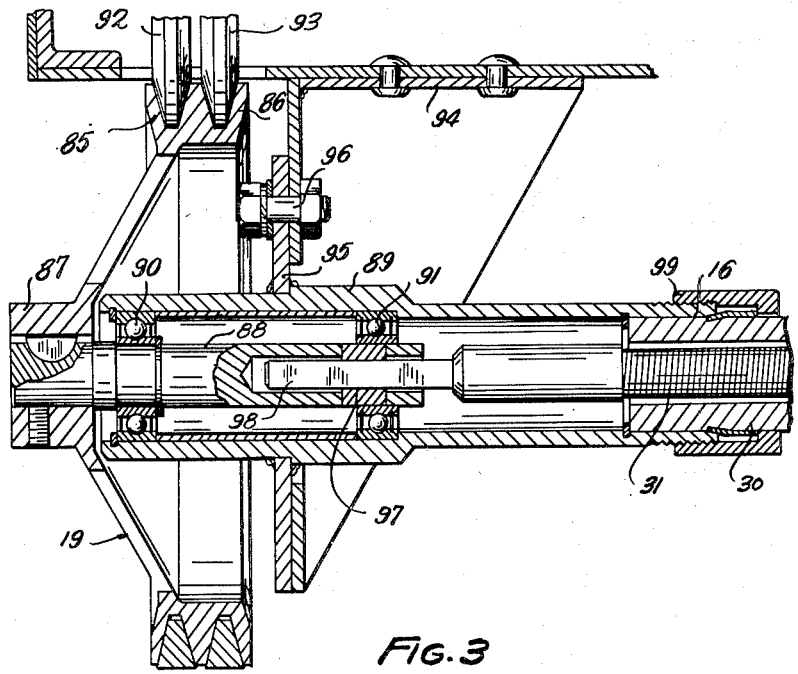
Fig. 3 is a longitudinal section taken through the flexible shaft means at the connection thereof with the air conditioning unit as indicated by section line 3—3 of Fig. 1.

The connecting means 19 by which the rear end of the flexible shaft 16 is connected with the air conditioning unit 13, is illustrated in Fig. 3 and is here shown as comprising a pair of pulleys 85 and 86 having a common hub 87 by which these pulleys are mounted on a shaft member 88, and a fixed bearing sleeve 89 in which the shaft member 88 is rotatably supported by a pair of antifriction bearings 90 and 91. The pulleys 85 and 86 are connected with the movable members of the air conditioning unit 13, such as the compressor and air impelling member or members thereof by belts 92 and 93 extending around these pulleys.

The bearing sleeve 89 is suitably secured to an available vehicle portion 94, as by means of the flange 95 secured to such vehicle portion by bolts 96. The shaft member 88 is provided with an axial passage 97 of a non-circular cross-sectional shape into which a stem 98 of a similar non-circular cross-sectional shape engages. The stem 98 is connected with the shaft member 31 of the flexible shaft 16. The sheath 30 of the flexible shaft 16 is secured to the fixed bearing sleeve 89 by a coupling 99.

From the accompanying drawings and the foregoing detailed description, it will now be readily understood that this invention provides novel driving means for a vehicle air conditioning unit by which such unit can be driven at different desired transmission ratio values from the vehicle driving motor, even though the conditioning unit may be located on the vehicle at a remote point from the driving motor, such as in the rear luggage compartment. Additionally, it will be seen that this novel driving means for the conditioning unit includes flexible shaft means extending beneath the floor of the vehicle compartment being conditioned, and automatically controlled magnetic clutch means by which the flexible shaft is connected with an auxiliary power take-off of the motor. It will be seen further that the automatic control of the magnetic clutch means is such that energization of one magnetic clutch provides a relatively low transmission ratio value for the conditioning unit and energization of the other magnetic clutch provides a relatively higher transmission ratio value, and that the transition from one transmission ratio value to the other is accomplished without any gap or interruption in the flow of driving torque to the conditioning unit.

Although the novel vehicle air conditioning drive mechanism provided by this invention has been illustrated and described herein to a somewhat detailed extent, it will be understood, of course, that the invention is not to be regarded as being limited correspondingly in scope, but includes all changes and modifications coming within the spirit of the invention and the scope of the claims hereof.

Having thus described my invention, I claim:

1. In a vehicle having a compartment to be air conditioned and a driving motor provided with an auxiliary power take-off, an air conditioning unit mounted on said vehicle at a point relatively remote from said motor and operable to supply conditioned air to said compartment, a flexible drive shaft having its power output end connected with said unit and its power input end adjacent said motor, clutch means actuatable to establish a drive connection between said power take-off and the power input end of said flexible shaft at any one of a plurality of drive ratios, and speed-responsive electric switch means for controlling the operation of said clutch means and the drive ratio from said power take off to said air conditioning unit.

2. In a vehicle having a compartment to be air conditioned and a driving motor provided with an auxiliary power take-off, an air conditioning unit mounted on said vehicle at a point relatively remote from said motor and operable to supply conditioned air to said compartment, a flexible drive shaft having its power output end connected with said unit and its power input end adjacent said motor, connecting devices providing a plurality of different power transmission ratios between said power take-off and said power input end including a plurality of magnetic clutches associated respectively with the connecting devices of said different transmission ratios, and automatic switch means responsive to the rotative speed of said motor and operable to selectively control the energization of said magnetic clutches, said switch means having an initial switch position causing energization of the magnetic clutch associated with the connecting device providing the relatively high transmission ratio and a second switch position causing energization of the magnetic clutch associated with the connecting device providing the relatively low transmission ratio.

3. In a vehicle having a compartment to be air conditioned and a driving motor provided with an auxiliary power take-off, an air conditioning unit mounted on said vehicle at a point relatively remote from said motor and operable to supply conditioned air to said compartment, a flexible drive shaft having its power output end connected with said unit and its power input end adjacent said motor, connecting devices providing relatively high and low value power transmission ratios between said power take-off and said power input end including a pair of magnetic clutches having energizing coils and associated respectively with the high and low ratio connecting devices, an energizing circuit including parallel circuit portions having the respective clutch coils therein, fixed switch contacts connected with said parallel circuit portions, and an automatically actuated movable switch contact engageable with said fixed contacts.

4. In a vehicle having a compartment to be air conditioned and a driving motor provided with an auxiliary power take-off, an air conditioning unit mounted on said vehicle at a point relatively remote from said motor and operable to supply conditioned air to said compartment, a flexible drive shaft having its power output end connected with said unit and its power input end adjacent said motor, connecting devices providing relatively high and low value power transmission ratios between said power take-off and said power input end including a pair of magnetic clutches having energizing coils and being associated respectively with the high and low ratio connecting devices, an energizing circuit including parallel circuit portions having the respective clutch coils therein, fixed switch contacts connected with said parallel circuit portions, and a movable switch member responsive to the operating speed of said driving motor and engageable with said fixed contacts, said movable switch member having an initial position in engagement with the fixed contact associated with the magnetic clutch for the high transmission ratio connecting device and a second position in engagement with the fixed contact associated with the magnetic clutch for the low transmission ratio connecting device.

References Cited in the file of this patent
UNITED STATES PATENTS

| | | |
|---|---|---|
| 1,983,827 | Winther et al. | Dec. 11, 1934 |
| 2,070,379 | Stramaglia | Feb. 9, 1937 |
| 2,083,585 | Winther | June 15, 1937 |
| 2,264,821 | Zukoski | Dec. 2, 1941 |
| 2,288,114 | Smith | June 30, 1942 |
| 2,344,864 | Griswold | Mar. 21, 1944 |
| 2,641,137 | Orcutt et al. | June 9, 1953 |
| 2,694,937 | Birbaum | Nov. 23, 1954 |